J. WILLMANN.
HOMOGENIZER.
APPLICATION FILED OCT. 19, 1910.
1,037,815.
Patented Sept. 3, 1912.
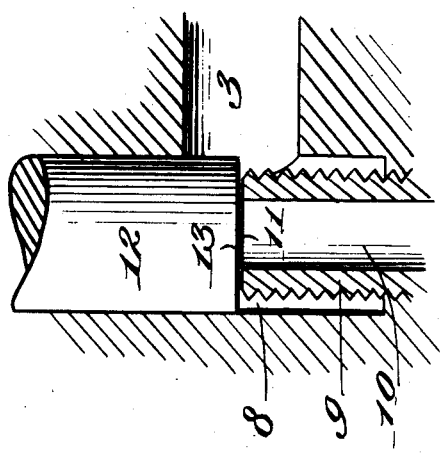
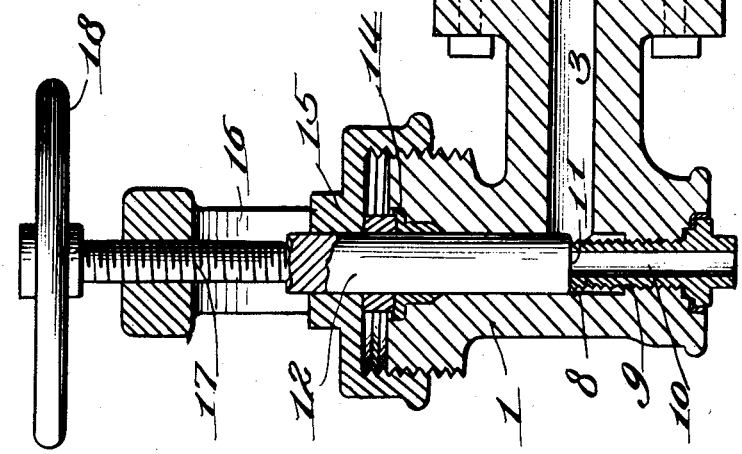
Witnesses.
Robert Everitt,
Inventor:
Joseph Willmann.
By
Atty.

UNITED STATES PATENT OFFICE.

JOSEPH WILLMANN, OF DERBY, CONNECTICUT

HOMOGENIZER.

1,037,815. Specification of Letters Patent. Patented Sept. 3, 1912.

Application filed October 19, 1910. Serial No. 587,931.

*To all whom it may concern:*

Be it known that I, JOSEPH WILLMANN, at present a subject of the Emperor of Germany, having announced my intention of becoming a citizen of the United States, residing at Derby, in the county of New Haven and State of Connecticut, have invented new and useful Improvements in Homogenizers, of which the following is a specification.

My present invention relates to improvements in the art of homogenizing liquids and particularly milk and cream and has for its object to provide an improved homogenizer which is capable of breaking up or disintegrating the fat globules to such an extent as to render the liquid homogeneous, the separation of the milk and cream or rising of the cream or its constituents to the top or surface of the milk being thereby prevented. The homogenizing action in accordance with my present invention is such that the casein contained in the milk remains practically undisturbed or unaltered so that milk and cream homogenized according to the present invention may be used in hot coffee and similar beverages without curdling and moreover the digestibility of the milk and cream is facilitated.

To these and other ends the invention consists in certain improvements and combinations and arrangements of parts all as will be hereinafter fully described, the features of novelty being pointed out particularly in the claims at the end of the specification.

In the accompanying drawing, Figure 1 represents a sectional view of the homogenizing device constructed in accordance with one embodiment of my invention; and Fig. 2 represents a detail enlarged view partly in section of the homogenizing elements.

Similar parts are designated by the same reference characters in the several views.

In the present instance the device embodies a casing 1 which contains the homogenizing elements and a high pressure pump 2 for supplying the liquid at homogenizing pressure. The casing 1 may be of any suitable construction, that shown in the present instance having an inlet passage 3 which communicates with and receives the liquid to be homogenized as it is discharged through a passage 4 formed in a manifold or header 5, this manifold being connected to the cylinder 6 of a pump capable of delivering the liquid to the homogenizing device at a pressure of between three and five thousand pounds per square inch, practice having demonstrated that the foregoing figures represent the limits of the preferred homogenizing pressure. The casing for the homogenizing device may be readily connected to the manifold of the pump by a flange connection 7, as shown, or by any other suitable means. The casing 1 is formed with a bore 8 which communicates with the inlet passage 3 and preferably extends at an angle to the latter.

The casing 1 contains the improved homogenizing elements, one of these elements 9 being in the present instance in the form of a bushing which is threaded into the bottom of the casing 1 in alinement with the bore 8, the connection of the bushing to the casing being such that a fluid-tight joint is formed between the parts and the bushing is capable of withstanding the relatively high homogenizing pressure. This bushing is hollow, it having a hole 10 extending axially therethrough and its upper end is formed with a smooth flat or plane surface 11. A coöperative homogenizing element 12, which in the present instance is in the form of a plunger, is fitted in the bore 8 of the casing and is capable of axial adjustment therein. That end of the element 12 opposed to the bushing 9 is formed with a perfectly smooth flat or plane surface 13 which is opposed to the correspondingly formed surface 11 on the coöperative element 9. Suitable means is provided for conducting the liquid at homogenizing pressure to the opposed plane surfaces 11 and 13, the upper end of the bushing 9 in the present instance being formed somewhat smaller than the bore 8, thus providing an annular feed groove or space for this purpose. To prevent leakage of the liquid past the plunger 12 a packing 14 surrounds the plunger and is held under suitable pressure by a cap 15 which may be threaded or otherwise clamped upon the casing. A yoke 16 is connected to the casing, a screw 17 is threaded in the yoke and bears upon the exterior end or top of the plunger 12. and a hand wheel 18 of suitable size is provided on the upper end of the screw.

According to the present invention, the liquid is introduced into the passage 3 at a suitable homogenizing pressure and passes from this passage into the bore 8 and from the latter it is projected in a very thin film between the opposed and coöperative plane or flat surfaces 11 and 13 of the homogenizing elements, this film moving in an inward direction and producing an impact at the center which will burst and disintegrate the fat globules to such a degree as to prevent the subsequent stratification or separation of the milk and cream. The homogenized liquid discharges through the hole 10 of the lower element or bushing 9.

An important feature of my present invention is that the homogenizing elements 10 and 12 are relatively adjustable to properly regulate the distance between the surfaces 11 and 13 and they are positively and rigidly maintained at a fixed adjustment when set. The screw 17 enables the distance between the plane surfaces 11 and 13 to be adjusted or regulated but it forms a rigid abutment that will positively limit the relative separation of the surfaces 11 and 13, thereby maintaining them at a fixed adjustment. In this manner the surfaces 11 and 13 may be set and rigidly maintained such a distance apart as will produce the necessary homogenizing pressure upon the liquid delivered from the pump whereby such liquid will enter the space between the plane surfaces 11 and 13 at sufficiently high velocity to cause disintegration of the fat globules by impact and by rigidly maintaining such adjustment between the surfaces 11 and 13 thorough homogenizing action is insured.

Practice has demonstrated that milk and cream homogenized with a device embodying the present invention retains the casein in practically undisturbed or unaltered condition and cream so homogenized can be used in hot coffee without curdling, a result that has not been heretofore obtained by any known homogenizing machine.

I claim as my invention:

1. A homogenizer embodying a suitable casing having an inlet passage for conducting liquid thereto at a homogenizing pressure, and homogenizing elements contained in the casing and having plane surfaces arranged in opposed relation and in alinement with said inlet passage, said elements being capable of relative adjustment to vary the distance between the opposed plane surfaces, one of said elements having an internal bore for conducting the homogenized product from the space between such elements, and means for positively maintaining said surfaces a fixed distance apart.

2. A homogenizing device embodying a casing having a bore, and means for conducting a liquid at homogenizing pressure thereto, a pair of homogenizing elements removably mounted in said bore and having opposed smooth surfaces for the passage of the liquid to be homogenized between them, one of said elements embodying a hollow bushing removably fitted in said casing to receive the homogenized liquid from the space between such elements, the bushing having its smooth surface formed on the inner extremity thereof and projecting into said bore of the casing, and a rigidly mounted screw coöperative with one of said elements to permit the distance between the opposed plane surfaces to be adjusted and to positively limit the relative separation of said surfaces.

3. A homogenizer embodying a casing having a bore and a passage communicating therewith for the flow of the liquid, a hollow bushing removably inserted in the casing and provided with a smooth surface arranged on one extremity thereof and located toward one end of said bore, a plug arranged in said bore and having a smooth surface coöperative with said smooth surface on the bushing, and means for maintaining said smooth surfaces in coöperative relation to homogenize a liquid forced between them.

4. A homogenizer embodying a casing having a bore and an inlet passage for the liquid leading into one side of said bore, a homogenizing element comprising a hollow bushing formed separately from and removably inserted in said casing, said bushing having a smooth surface on its inner extremity located toward one end of said bore, a homogenizing element comprising a plug contained in said bore and having a smoth surface coöperative with said smooth surface on the bushing, a passage being provided by one of said homogenizing elements for conducting the liquid to be homogenized to the peripheral edges of said smooth surfaces, and means for maintaining said smooth surfaces in coöperative relation.

In testimony whereof I have hereunto set my hand in presence of two subscribing witnesses.

J. WILLMANN.

Witnesses:
 CLARENCE A. BATEMAN,
 ROSE M. SEFTON.